Nov. 15, 1927.

A. G. ADAM 1,649,276

ELECTRICAL SWIVEL CONNECTION

Filed Dec. 18, 1923

INVENTOR.
A. G. Adam,
BY
ATTORNEYS.

Patented Nov. 15, 1927.

1,649,276

UNITED STATES PATENT OFFICE.

ALFRED G. ADAM, OF SIOUX CITY, IOWA.

ELECTRICAL SWIVEL CONNECTION.

Application filed December 18, 1923. Serial No. 681,360.

My present invention has for its objects the production of an improved electrical swivel connection adapted to be interposed in a multiple electrical conductor cord, as a telephone or lamp cord to effectually prevent such cord from twisting upon itself and yet form a perfect electrical connection of low resistance.

Furthermore, the invention contemplates a device of this class which is comparatively inexpensive in construction and to and from which the cord conductors may be readily attached and detached.

With these and other objects in view, the invention, consisting in the construction, combination and novel arrangement of parts will be clearly understood from the following description, reference being had to the accompanying drawings, which form a part of this application and in which like characters of reference indicate corresponding parts throughout the several views, of which,—

Referring, now, to the illustrations, the embodiment chosen for illustration is particularly adapted to be "cut in" on a three conductor telephone cord, yet it will be clearly understood that without departing from the scope and spirit of the invention, the device may be altered and modified to accommodate any number of conductors.

The cord shown embodies conductors, 5, 6 and 7 with a common covering, 8. The cord is cut and between its adjacent ends is interposed my device, consisting of an inner tube, 9, of insulation material and having at one end a head or external shoulder, 10, and threaded at the other end to receive a cap-nut, 11, having a central opening, 12, through which one end of the cord extends and projects into the core, 9.

The tube or core, 9, is encircled by three rings, 13, 14 and 15, of conductive material interposed between the shoulder, 10, and cap-nut, 11, and between the said rings are interposed insulation rings, 16.

The tube, 9, is provided with lateral openings, 17, through which are respectively extended the conductors, 5, 6 and 7, their end portions being interposed between the conducting and insulation rings, the sides of the conducting rings being preferably provided with arcuate grooves, 18, to receive the end portions of the conductors, 5, 6 and 7. The nut, 11, firmly clamps the rings on the core and insures perfect electrical connection between the rings and cord conductors. Within the cap-nut, 11, the cord is provided with a boss, 19, which engages the nut, thus relieving the cord conductors within the core of tensile strain.

Figure 1:
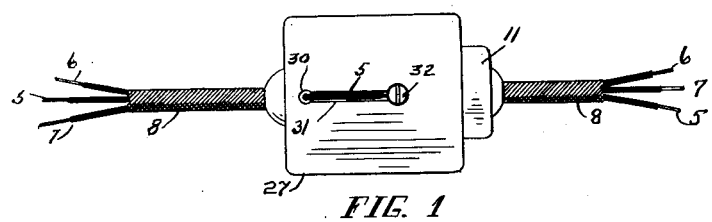
Fig. 1 is a plan of an electrical swivel coupling constructed in accordance with my invention.
Figure 2:
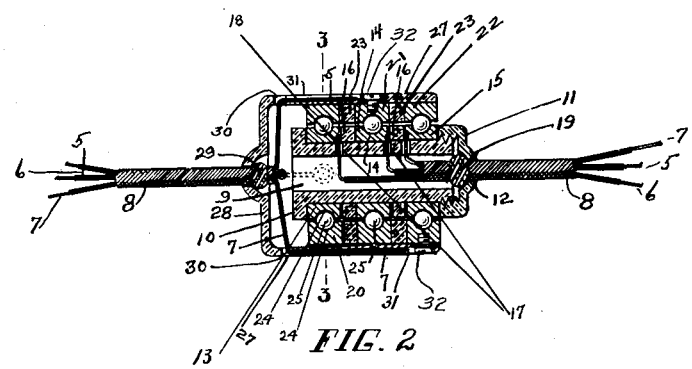
Fig. 2 is a longitudinal section of the same.
Figure 3:
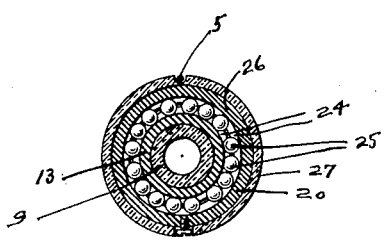
Fig. 3 is a vertical section of the same taken on the line 3—3 of Fig. 2.
Figure 4:
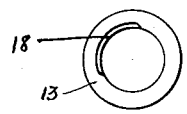
Fig. 4 is an end elevation of one of the inner rings.

It will now be seen that the cord portion at the right in Figs. 1 and 2 is carried by the core of the swivel and the parts fixed thereto.

The left cord end portion is carried by a swivel member including outer conducting rings, 20, 21 and 22, freely encircling the inner rings, 13, 14 and 15, respectively, and separated by insulation rings, 23. The inner and outer conducting rings are provided with ball races, 24, in which are anti-friction balls, 25, upon which the inner and outer swivel members freely rotate. The outer rings are open as at 26 to permit their being sprung open to admit the balls.

The outer rings fit snugly within a cylindrical open-ended insulation casing, 27, having a head, 28, at one end, through the center of which passes the adjacent end portion of the cord which is knotted or provided with a boss, 29, adapted to engage the head, 28, and prevent tensile strain on the cord conductors within the casing. The conductors, 5, 6 and 7, of this portion of the cord are extended, respectively, through openings, 30, in the casing, laid in longitudinal peripheral grooves, 31, in the casing, and connected, respectively, with binding screws, 32, extending through the casing wall and threaded into the respective rings, 20, 21 and 22, whereby the conductors, 5, 6 and 7 of each cord portion are connected electrically with the corresponding conductors of the other cord portion.

It will now be clear that relative rotation may take place between the cord portions, thus preventing twisting of the cord and without impairing the conductivity of the cord.

Although I have illustrated and described but one embodiment of the invention, I would not be understood as being limited to the specific structure disclosed, for various alterations and modifications may be made in the details of construction and arrangement of parts without departing from the spirit and scope of the invention as defined in the following claim.

I claim—

An electrical swivel coupling tube, interposed between two portions of a multiple conductor cord, the end of one portion being provided with a boss and thence separated into its multiple cords; comprising an inner swivel member including a tubular insulating core having an external shoulder at one end and a cap nut at the other, the cap nut being provided with an opening to receive the cord portion having the boss, said boss being held by the cap to relieve the multiple cords within the core of strain, alternately arranged inner conducting and non-conducting rings encircling the core, and clamped between the shoulder and cap nut, an external swivel member including an outer insulating casing having end and side walls, and spaced outer conducting rings therein encircling the inner conducting rings, the outer and inner conducting rings being provided with ball races, bearing balls received between the outer and inner conducting rings in said ball races so as to secure the rings against separation, screw bolts extending through the side wall of the outer swivel member casing and engaging the outer rings to secure them within said casing, said casing having an aperture in its end wall to receive one portion of said cord, and having openings in its side wall to receive the individual conductors of said cord portion whereby said cord portion may be extended through said aperture into the casing and the individual conductors, thence extended out through said openings, the screw bolts serving to secure the ends of said conductors and to establish an electrical connection thereof with the outer conducting rings.

In testimony whereof, I have hereunto set my hand this 14th day of December, 1923.

ALFRED G. ADAM.